(12) United States Patent
Wildermuth et al.

(10) Patent No.: US 12,064,895 B2
(45) Date of Patent: Aug. 20, 2024

(54) TOOL DEVICE

(71) Applicant: FESTOOL GMBH, Wendlingen (DE)

(72) Inventors: Markus Wildermuth, Esslingen (DE); Josua Frank, Schorndorf (DE); Harald Ruhland, Nürtingen (DE)

(73) Assignee: FESTOOL GmbH, Wendlingen (DE)

( * ) Notice: Subject to any disclaimer, the term of this patent is extended or adjusted under 35 U.S.C. 154(b) by 331 days.

(21) Appl. No.: 17/597,478

(22) PCT Filed: May 12, 2020

(86) PCT No.: PCT/EP2020/063129
§ 371 (c)(1),
(2) Date: Jan. 7, 2022

(87) PCT Pub. No.: WO2021/004679
PCT Pub. Date: Jan. 14, 2021

(65) Prior Publication Data
US 2022/0242002 A1    Aug. 4, 2022

(30) Foreign Application Priority Data
Jul. 10, 2019   (DE) .................. 10 2019 210 187.9

(51) Int. Cl.
*B27B 5/38*    (2006.01)
*B27B 5/18*    (2006.01)
*B27B 5/20*    (2006.01)

(52) U.S. Cl.
CPC ............. *B27B 5/38* (2013.01); *B27B 5/188* (2013.01); *B27B 5/208* (2013.01)

(58) Field of Classification Search
CPC ............ B27B 5/38; B27B 5/188; B27B 5/208
See application file for complete search history.

(56) References Cited

U.S. PATENT DOCUMENTS 7,373,863 B2    5/2008  O'Banion et al.
10,118,308 B2 *  11/2018  Gass .................. B27G 19/08
(Continued)

FOREIGN PATENT DOCUMENTS

DE     1 920 062    10/1970
JP    2003-527255    9/2003

OTHER PUBLICATIONS

International Search Report issued in International Application No. PCT/EP2020/063129, Jul. 29, 2020, 5 pages w/ translation.
(Continued)

*Primary Examiner* — Omar Flores Sanchez
(74) *Attorney, Agent, or Firm* — HSML P.C.

(57) ABSTRACT

A tool device, in particular a saw device, having a tool for processing a workpiece located in a working area. The tool device includes a tool braking device for braking a tool rotary movement of the tool, and a multi-joint arrangement by means of which the tool can be pivoted selectively in a feed direction into the working area or in a removal direction out of the working area. The multi-joint arrangement is designed to, while maintaining the pivotability of the tool, absorb and/or redirect forces occurring during braking of the tool rotary movement, so that the tool is not pivoted in the feed direction by the forces occurring during braking of the tool rotary movement or is pivoted in the removal direction by the forces occurring during braking of the tool rotary movement.

24 Claims, 8 Drawing Sheets

(56) References Cited

U.S. PATENT DOCUMENTS

| | | |
|---|---|---|
| 10,882,123 B2* | 1/2021 | Brewster .............. B23D 59/003 |
| 2002/0017179 A1 | 2/2002 | Gass et al. |
| 2002/0056348 A1 | 5/2002 | Gass et al. |
| 2002/0059855 A1 | 5/2002 | Gass et al. |
| 2004/0173430 A1 | 9/2004 | Gass |
| 2005/0178259 A1* | 8/2005 | Gass ....................... B27B 13/14 |
| | | 83/397.1 |
| 2005/0204885 A1 | 9/2005 | Gass et al. |
| 2014/0260846 A1* | 9/2014 | Voong .................... B23D 47/00 |
| | | 83/13 |

OTHER PUBLICATIONS

Written Opinion issued in International Application No. PCT/EP2020/063129, Jul. 29, 2020, 6 pages.

Examination Report issued in corresponding German Patent Application No. 10 2019 210 187.9, Mar. 16, 2020, 8 pages.

Notice of Reasons for Refusal issued in corresponding Japanese Patent Application No. 2021-548162, Dec. 20, 2023, 17 pages w/translation.

* cited by examiner

TOOL DEVICE

BACKGROUND OF THE INVENTION

The invention relates to a tool device, in particular a saw device, having a tool for processing a workpiece located in a working area. The tool device comprises a tool braking device for braking a rotary movement of the tool. The tool device further comprises a multi-joint arrangement for selectively pivoting the tool in a feed direction into the working area or in a removal direction out of the working area.

The tool is, for example, a clockwise rotating saw blade. The pivoting of the tool is exemplarily about a base section joint, which may also be referred to as a tilt joint. In a conventional tool device, if the tool is braked in a short time by means of the tool braking device (for example, to reduce injury to the user), the resulting braking torque is supported in the tilt joint, whereby a tilting movement of the tool in the feed direction—in particular a downward tilting of the tool in the direction of the user—is caused. This can cause serious injuries.

US 2002/0017179 A1 describes a miter saw having two swing arms, each connected to a base and a housing.

U.S. Pat. No. 7,373,863 B2 describes a miter saw with a safety mechanism. When a dangerous condition is detected, the saw blade is braked with a saw stop. The moment of inertia of the saw blade is converted into a linear force that drives the saw blade upwards.

SUMMARY OF THE INVENTION

It is an object of the invention to increase the operational safety of the tool device mentioned at the beginning.

The object is solved by a multi-joint arrangement according to claim 1. The multi-joint arrangement is designed to absorb and/or redirect forces occurring during braking of the tool rotary movement while maintaining the pivotability of the tool, so that the tool is not pivoted in the feed direction by the forces occurring during braking of the tool rotary movement or is pivoted in the removal direction by the forces occurring during braking of the tool rotary movement.

The multi-joint arrangement thus in particular prevents the tool from being pivoted (further) into the working area during braking. This can in particular prevent a user reaching into the working area at the time of braking from being injured by the saw blade. Provided that the braking occurs in response to a contact of the saw blade with the user—i.e. in particular as a response to an injury of the user—the described multi-joint arrangement can in particular minimize the extent of the injury, since it is preferably prevented that the tool is pivoted further towards the user by the braking. Consequently, the operational safety can be increased.

Advantageous further embodiments are the subject of the subclaims.

BRIEF DESCRIPTION OF THE DRAWINGS

Further exemplary details as well as exemplary embodiments are explained below with reference to the figures. Thereby shows FIG. 1 a schematic view of a tooling device according to a first embodiment, wherein the tool is located outside the working area, FIG. 2 a schematic view of the tool device according to the first embodiment, wherein the tool is located in the working area, FIG. 3 a schematic view of a tool head with drawn in forces that occur during braking of the tool rotation, FIG. 4 a schematic view of a multi-joint arrangement with the pivot range drawn in, FIG. 5 a schematic view of a multi-joint arrangement with the axis angle drawn in, FIG. 6 a schematic view of a multi-joint arrangement with an angular range of a force direction drawn in, FIG. 7 a schematic view of a variant of the tool device, FIG. 8 a diagram of the temporal course of the position of the tool, FIG. 9 a schematic view of a tool device according to a second embodiment and FIG. 10 a schematic view of a further variant of the tool device according to the first embodiment.

DETAILED DESCRIPTION OF THE INVENTION

In the following explanation, reference is made to the y-direction and z-direction shown in the figures, as well as to the x-direction running perpendicular to the drawing plane. The x-direction, y-direction and z-direction are orthogonal to each other.

Figure 1:
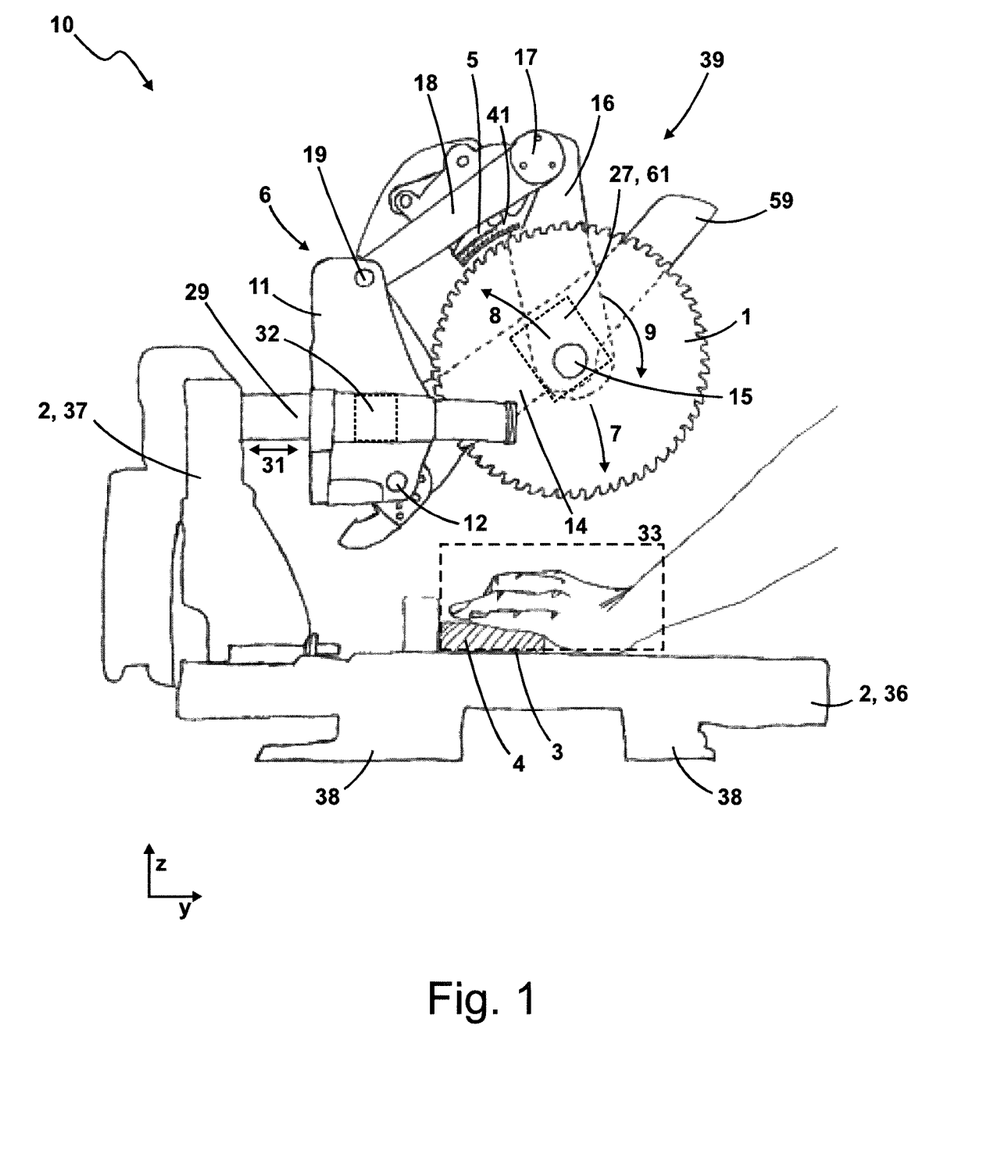

FIG. 1 shows a tool device 10 according to a first embodiment. The tool device 10 is exemplarily designed as a saw device, in particular as a circular table saw or mitre saw, preferably as a sliding compound mitre saw.

The tool device 10 comprises a tool 1, exemplarily a saw blade. The tool 1 serves to process a workpiece 4 located in a working area 33.

The tool device 10 comprises a tool braking device 5 for braking a tool rotary movement 9 of the tool 1.

The tooling device 10 further comprises a multi-joint arrangement 6 for selectively pivoting the tool 1 in a feed direction 7 into the work area 33, or in a removal direction 8 out of the work area 33.

The multi-joint arrangement 6 is designed to, while maintaining the pivotability of the tool, absorb and/or redirect forces occurring during braking of the tool rotary movement 9 1, so that the tool 1 is not pivoted in the feed direction 7 by the forces occurring during braking of the tool rotary movement 9 or is pivoted in the removal direction 8 by the forces occurring during braking of the tool rotary movement 9.

Further exemplary details will be explained below:

In an exemplary embodiment, the tool device 10 comprises a support structure 2 by which the working area 33 is expediently provided. The tool 1 is pivotally mounted relative to the support structure 2 via the multi-joint arrangement 6. Exemplarily, the support structure 2 comprises a workpiece support surface 3 on which the workpiece 4 can be placed during processing of the workpiece 4 with the tool 1. Exemplarily, the workpiece support surface 3 is oriented normal to the z-direction. The working area 33 is expediently located on and/or in the z-direction above the workpiece support surface 3. The working area 33 is in particular a three-dimensional area extending in the x-, y- and z-directions.

In an exemplary embodiment, the support structure 2 comprises a horizontal section 36, for example a table section, the upper side of which constitutes the workpiece support surface 3. On the underside of the support structure 2, in particular of the horizontal section 36, standing elements 38 are expediently arranged, with which the tool device 10 can be placed on a support.

In an exemplary embodiment, the support structure 2 further comprises a vertical section 37 by means of which the tool head 39 is held offset in the z-direction, in an exemplary embodiment offset upwards, relative to the workpiece support surface 3, in particular relative to the horizontal section 36.

Exemplarily, the multi-joint arrangement 6 comprises at least four joints. Expediently, the multi-joint arrangement 6 may also be referred to as a 4-joint kinematic system. Preferably, the multi-joint arrangement 6 comprises exactly four joints. Alternatively, the multi-joint arrangement 6 may comprise more than four joints, for example exactly five or exactly six joints.

Exemplarily, the multi-joint arrangement 6 comprises a base section 11. Via the base section 11, the multi-joint arrangement 6 is coupled to the support structure 2, in particular to the vertical section 37. Exemplarily, the base section 11 comprises a base section joint 12 and a secondary swing arm joint 19, which is expediently arranged offset in z-direction with respect to the base section joint 12. The base section joint 11 is expediently oriented with its longitudinal axis substantially parallel to the z-direction. The base section joint 12 may also be referred to as a tilt joint.

Exemplarily, the multi-joint arrangement 6 further comprises a main swing arm 14 pivotally mounted to the base section 11 via the base section joint 12, and a secondary swing arm 18 pivotally mounted to the base section 11 via the secondary swing arm joint 19. Exemplarily, the main swing arm 14 and the secondary swing arm 18 are elongated and have their longitudinal axes oriented substantially parallel to each other. In an exemplary embodiment, the main swing arm 14 and the secondary swing arm 18 are arranged in positive y-direction adjacent to the base section 11. Exemplarily, the main swing arm 14 is arranged closer to the working area 33 than the secondary swing arm 18. Exemplarily, the main swing arm 14 is arranged below the secondary swing arm 18 in the z-direction.

The multi-joint arrangement 6 further comprises a side swing arm 16 pivotally mounted to the main swing arm 14 via a main swing arm joint 15. The side swing arm 16 is further pivotally mounted to the secondary swing arm 18 via a side swing arm joint 17. In an exemplary embodiment, the side swing arm 16 is elongated and is expediently oriented with its longitudinal axis substantially parallel to the base section 1. The side swing arm 16 connects the main swing arm 14 and the secondary swing arm 18. The side swing arm 16 is offset in positive y-direction relative to the base section 11.

The base section 11, the main swing arm 14, the side swing arm 16 and the secondary swing arm 18 together form a frame-like structure in an exemplary manner. In the position shown in FIG. 2 (hereinafter also referred to as the working position), the multi-joint arrangement 6 has an exemplary substantially rectangular shape, wherein expediently the main swing arm 14 and the secondary swing arm 18 are aligned with their longitudinal axes substantially parallel, in particular substantially horizontal, exemplarily in the y-direction, and/or the base section 11 and the side swing arm 16 are aligned with their longitudinal axes substantially parallel, in particular substantially vertical, exemplarily in the z-direction. In the position shown in FIG. 1 (hereinafter also referred to as the safety position), the multi-joint arrangement 6 has, exemplarily, substantially the shape of a rhombus, wherein expediently the main swing arm 14 and the secondary swing arm 18 are aligned with their longitudinal axes substantially parallel and/or the base section 11 and the side swing arm 16 are aligned with their longitudinal axes substantially parallel.

The four joints of the multi-joint arrangement 6—i.e. the base section joint 12, the main swing arm joint 15, the side swing arm joint 17 and the secondary swing arm joint 19—are each expediently designed as pivot joints and are aligned with their pivot axes parallel to one another, in particular parallel to the x-direction.

By means of the multi-joint arrangement 6, the tool 1 can be pivoted around the base section joint 12. The pivoting in the feed direction 7 takes place in a first rotational direction about the pivot axis of the base section joint 12—exemplarily in a clockwise direction—and the pivoting in the removal direction 8 takes place in a second rotational direction opposite to the first rotational direction about the pivot axis of the base section joint 12—exemplarily in a counterclockwise direction.

Figure 2:
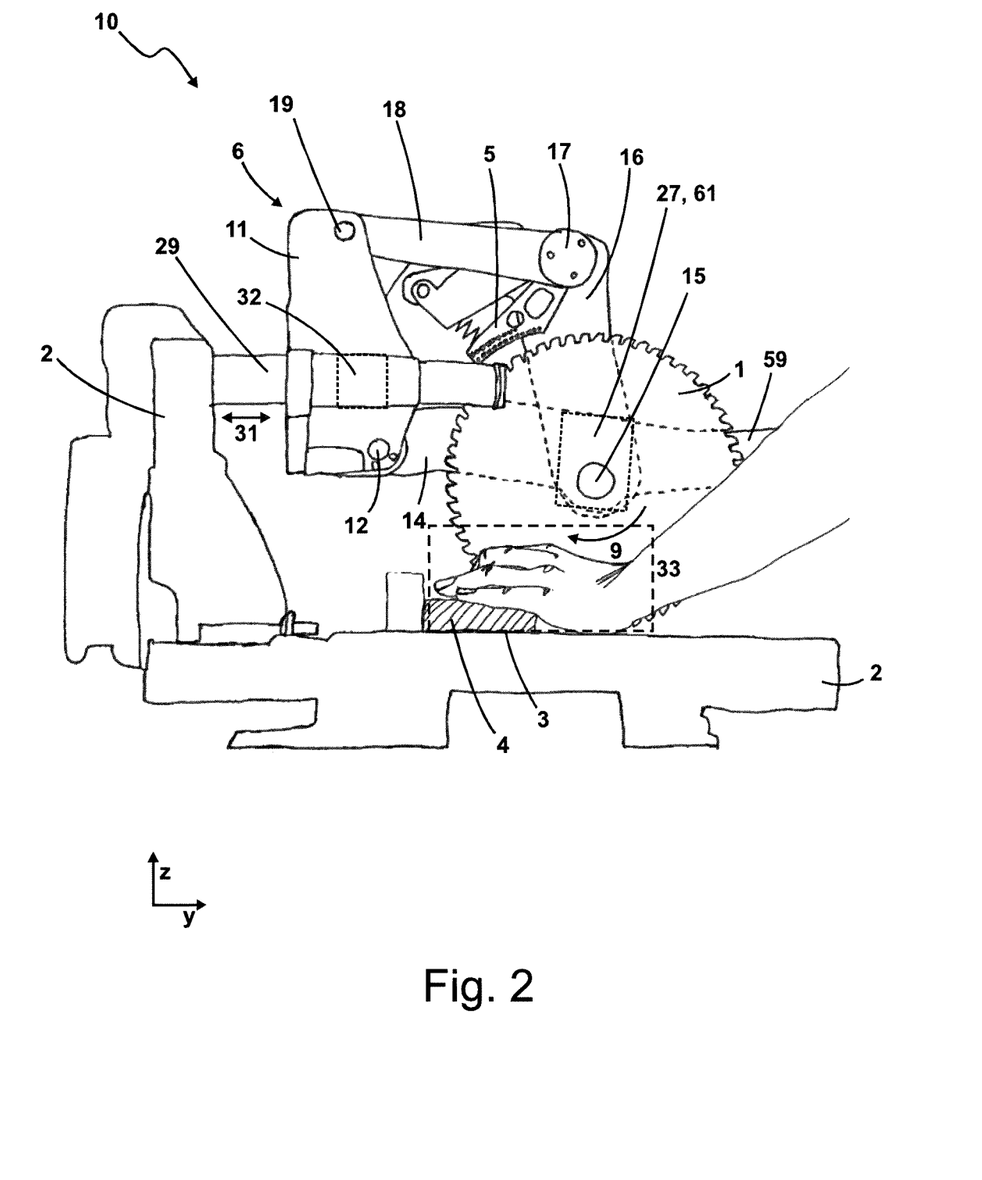

By means of the multi-joint arrangement 10, the tool 1 can selectively be pivoted into the safety position, in which it is positioned outside the working area 33, in particular above the working area 33 in the z-direction, as shown in FIG. 1, or into the working position, in which it projects into the working area 33, as shown in FIG. 2, and can process, in particular saw, a workpiece 4 located in the working area 33.

The pivoting of the tool 1 from the safety position into the working position takes place in the feed direction 7, and the pivoting of the tool 1 from the working position into the safety position takes place in the removal direction 8. Exemplarily, the tool 1 is pivoted towards the workpiece support surface 3 when pivoted in the feed direction 7, and is pivoted away from the workpiece support surface 3 when pivoted in the removal direction 8.

The pivoting of the tool 1 by means of the multi-joint arrangement 10 is (in normal operation, i.e. when the tool braking device 5 does not brake the tool rotary movement 9) preferably effected by manual actuation by the user, for example via a handle 59 arranged on the multi-joint arrangement 6, exemplarily on the main swing arm 14.

As mentioned above, the multi-joint arrangement 6 is designed to, while maintaining the pivotability of the tool 1, absorb and/or redirect forces occurring during braking of the tool rotary movement 9, so that the tool 1 is not pivoted in the feed direction 7 by the forces occurring during braking of the tool rotary movement 9 or is pivoted in the removal direction 8 by the forces occurring during braking of the tool rotary movement 9.

The pivotability of the tool 1 by means of the multi-joint arrangement 6 is maintained during braking and/or after braking, in particular in the feed direction 7 and/or removal direction 8. The pivotability of the tool 1 is in particular also given in a braking state in which the tool braking device 5, in particular the brake body 41, is in engagement with the tool 1 and thus blocks the tool rotary movement 9. Thus, the tool 1 can in principle still be pivoted around the base section joint 12, in particular by means of the multi-joint arrangement 6, for example by manual actuation by the user, even during braking and/or after braking of the tool rotary movement 9. Thus, the multi-joint arrangement 6, in particular the base section joint 12, is expediently not locked during braking and/or after braking of the tool rotary movement 9. In particular, the pivotability provided in the braking state makes it possible, in a case in which a body part of a user, for example a finger, is trapped due to the current position of the tool 1, to release the body part by (in particular manual) pivoting of the tool 1 (which is preferably still in the braking state) and to thus release it from the trapping. In particular, no disassembly of components of the tool device is required for the release of the body part.

Preferably, the multi-joint arrangement 10 is adapted and/or arranged such that during braking the centre of gravity of the tool device 10 moves in a direction different from the feed direction 7. The direction different from the feed direction 7 is in particular a direction substantially opposite to the feed direction 7.

Figure 3:
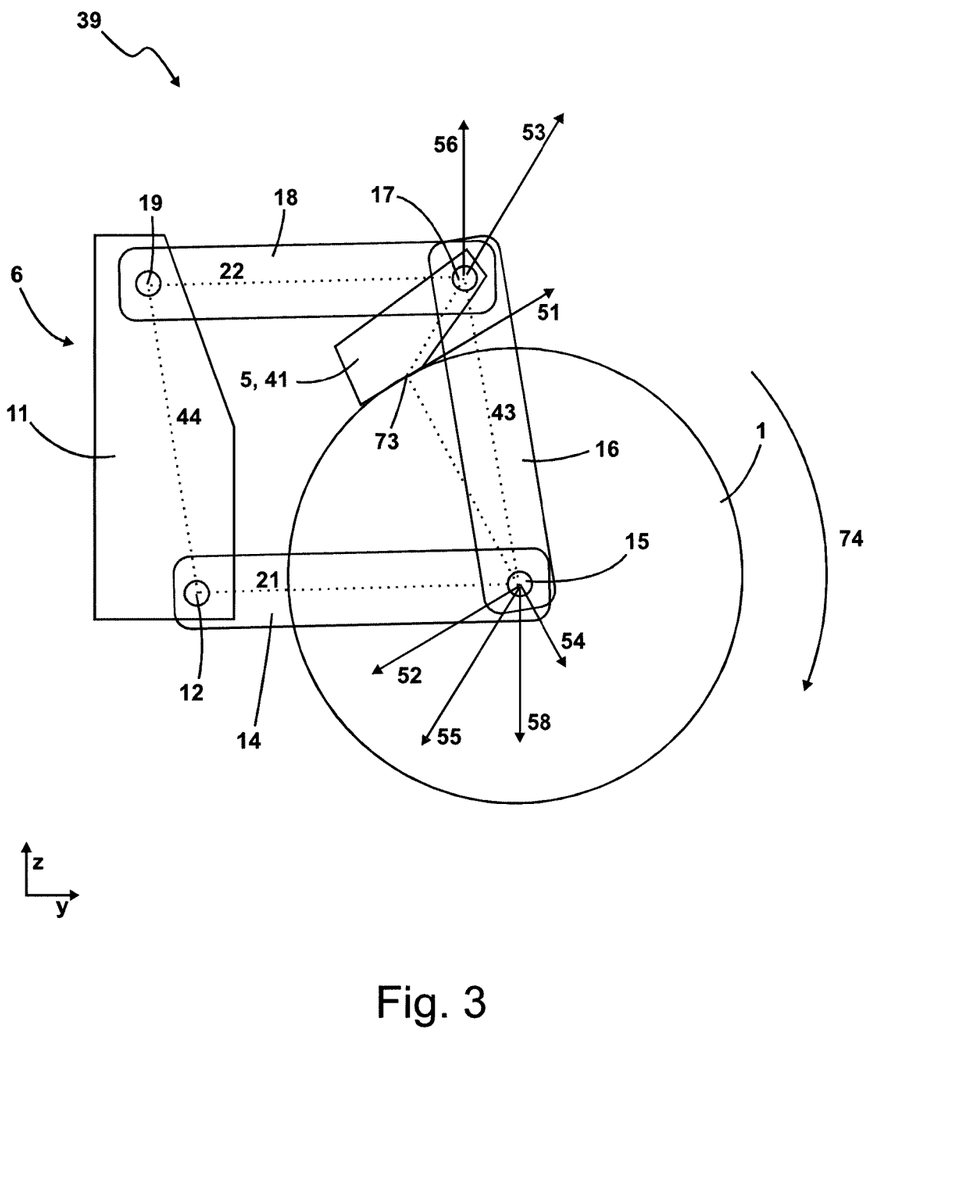

With reference to FIG. 3, it will be explained in more detail below how the multi-joint arrangement 6 absorbs and/or redirects the forces that occur during braking of the tool rotary movement 9.

Figure 5:
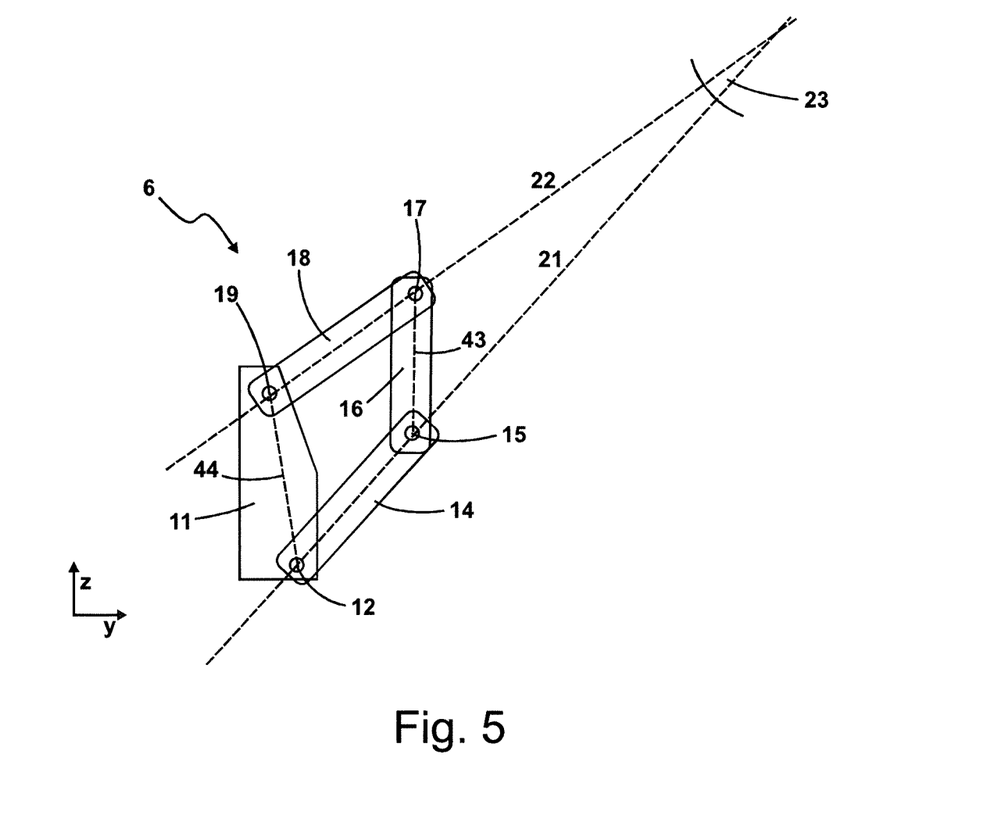

In this context, reference shall be made to the (imaginary) axes shown in FIG. 5: an (imaginary) main swing arm axis 21 passing through the base section joint 12 and the main swing arm joint 15, an (imaginary) secondary swing arm axis 22 passing through the secondary swing arm joint 19 and the side swing arm joint 17, an (imaginary) base section axis 44 passing through the base section joint 12 and the secondary swing arm joint 19, and an (imaginary) side swing arm axis 43 passing through the main swing arm joint 15 and the side swing arm joint 17. The main swing arm axis 21, the secondary swing arm axis 22, the base section axis 44 and/or the side swing arm axis 43 expediently lie in a y-z plane.

With reference to FIG. 3, the forces acting during braking will be discussed in more detail below. In particular, the forces occurring during braking comprise a first second-stage force 53 with a first force component 56 and a third second-stage force 55 with a second force component 58.

The multi-joint arrangement 6 is in particular designed to absorb and/or redirect the forces occurring during braking of the tool rotary movement 9, in particular the first second-stage force 53 and/or the third second-stage force 55, with the main swing arm 14 and/or the secondary swing arm 18 (and/or the side swing arm 16), so that the first and second force components 56, 58, which act orthogonally to the secondary swing arm axis 21 and/or the main swing arm axis 22, cancel each other out or so that the first force component 56 acting in the direction away from the working area 33 predominates—i.e. is greater, in particular in amount, than the second force component 58 acting in the direction towards the working area 33.

As shown in FIG. 3, deceleration of the tool rotary movement 9 during braking results in a moment of inertia 74 of the tool 1 about the axis of rotation of the tool 1. When the tool rotary movement 9 is braked, for example by contact of the brake body 41 with the tool 1, a first first-stage force 51 and a second first-stage force 52 occur. The first-stage forces 51, 52 act on the multi-joint arrangement 6 and occur in response to the braking force exerted by the brake body 41 on the tool 1. The first-stage forces 51, 52 may also be referred to as reaction forces, wherein the first first-stage force 51 is a reaction force of the braking force applied to the tool 1 and the second first-stage force 52 is a reaction force of the first first-stage force 51. The first first-stage force 51, starting from the contact point 73 between the brake body 41 and the tool 1, exemplarily points in tangential direction with respect to the tool 1 or the tool rotation 9. The second first-stage force 52 acts on a tool bearing supporting the tool 1 and/or a shaft coupled to the tool 1, and/or on the main swing arm joint 15. The second first-stage force 52, starting from the main swing arm joint 15, exemplarily points in opposite direction to the first first-stage force 51.

The first first-stage force 51 is divided into a first second-stage force 53 and a second second-stage force 54, expediently according to the suspension of the brake body 41 and/or of the tool 1. The first second-stage force 53 acts exemplarily in the side swing arm joint 17 and, starting from the side swing arm joint 17, points in the same direction as an (imaginary) connecting line between the contact point 73 and the side swing arm joint 17. In an exemplary embodiment, the second second-stage force 54 acts in the main swing arm joint 15 and/or on the tool bearing and, starting from the main swing arm joint 15, points in the same direction as an (imaginary) connecting line between the contact point 73 and the main swing arm joint 15.

The first second-stage force 53 comprises the first force component 56. The first force component 56 acts in the side swing arm joint 17 and, starting from the side swing arm joint 17, points in a direction orthogonal to the secondary swing arm axis 22 (and preferably orthogonal to the pivot axis defined by the secondary swing arm joint 19), namely in a direction away from the main swing arm joint 15, in particular in a direction away from the working area 33 or the workpiece support surface 3. Exemplarily, the first force component 56 points upwards. Expediently, the first force component 56 leads to a pivoting of the tool 1 in the removal direction 8.

The sum of the second second-stage force 54 and the second first-stage force 52 provides the third second-stage force 55. The third second-stage force 55 comprises the second force component 58 acting in the main swing arm joint 15 and/or the tool bearing and, starting from the main swing arm joint 15, in a direction orthogonal to the main swing arm axis 21 (and preferably orthogonal to the swing arm axis defined by the base section joint 12), namely in a direction away from the side swing arm joint 17, in particular in a direction towards the working area 33 or towards the workpiece support surface 3. Exemplarily, the second force component 58 points downward. The second force component 58 expediently causes the tool 1 to pivot in the feed direction 7.

The multi-joint arrangement 6 is expediently configured such that the first force component 56 and the second force component 58 have the same magnitude, or such that the first force component 56 is greater (in particular in magnitude) than the second force component 58.

If the first force component 56 and the second force component 58 have the same magnitude, the tool 1 is not tilted at all—in particular not in the feed direction 7—by the forces caused by braking the tool rotary movement 9. If the first force component 56 is greater in magnitude than the second force component 58, the tool 1 is pivoted in the removal direction 8 by the forces caused by braking the tool rotary movement 9.

How the first force component 56 and the second force component 58 relate to each other depends on the axis angle 23 between the main swing arm axis 21 and the secondary swing arm axis 22 shown in FIG. 5.

The axis angle 23 is expediently zero degrees or greater than zero degrees. Preferably, the axis angle 23 is not less than zero degrees. The axis angle 23 is preferably between 45 degrees and zero degrees, in particular between 15 degrees and 5 degrees. At an axis angle 23 of zero degrees, the main swing arm axis 21 and the secondary swing arm axis 22 are parallel to each other. At an axis angle 23 of greater than zero degrees, the main swing arm axis 21 and the secondary swing arm axis 22 cross on that side of the base section 11 on which the tool 1 is arranged. When the axis angle 23 is greater than zero degrees, the main swing arm axis 21 and the secondary swing arm axis 22 cross on the side of the base section 11 located in the positive y-direction (in FIG. 5, exemplarily on the right side of the base section 11). In this case, starting from the base section joint 12, the main swing arm axis 21 approaches the secondary swing arm axis 22 more and more in the direction towards the main swing arm joint 15.

At an axis angle 23 of less than zero degrees, the main swing arm axis 21 and the secondary swing arm axis 22 would meet on the side of the base section 11 located in the negative y-direction (for example on the left side of the base section 11 in FIG. 5).

With the described axis angle of greater than or equal to zero degrees, it can be ensured that when the tool rotary movement 9 is braked, the first force component 56 is (in terms of magnitude) equal to (for an axis angle 23 of zero degrees) or greater than (for an axis angle 23 of greater than zero degrees) the second force component 58.

Figure 4:
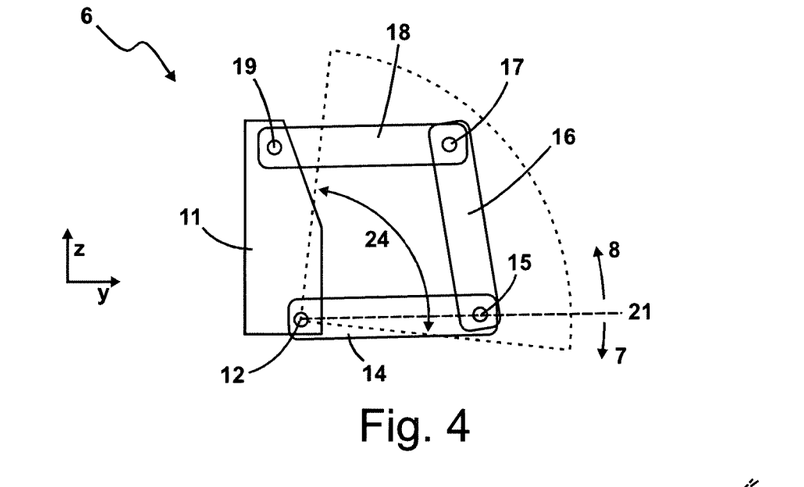

FIG. 4 shows the pivot range 24 of the multi-joint arrangement 10. Exemplarily, the pivot range 24 is defined here as the angle by which the (imaginary) main swing arm axis 21 can be pivoted at a maximum about the pivot axis of the base section joint 12. In particular, the pivot range 24 denotes the maximum angle by which the tool 1 is pivotable by the multi-joint arrangement 6, in particular relative to the support structure 2 and/or the working area 33. Exemplarily, the pivot range 24 lies in a y-z plane. The plane of the pivot range 24 may also be referred to as the pivot plane. Preferably, the pivot plane is pivotable about a y-axis.

According to a preferred embodiment, over at least 80% of the pivot range 24 of the multi-joint arrangement 6, in particular over the entire pivot range 24 of the multi-joint arrangement 6, preferably over a pivot range of at least 55 degrees, the axis angle 23 is zero degrees or greater than zero degrees. Thus, expediently, the main swing arm axis 21 and the secondary swing arm axis 22 run parallel to each other or cross each other at the axis angle 23 on that side of the base section 11 on which the tool 1 is arranged, over at least 80% of the pivot range 24 of the multi-joint arrangement 6, in particular over the entire pivot range 24 of the multi-joint arrangement 6, preferably over a pivot range 24 of 55 degrees.

According to a preferred embodiment, the axis angle 23 is greater than zero degrees over at least 80% of the pivot range 24 of the multi-joint arrangement 6, in particular over the entire pivot range 24 of the multi-joint arrangement 6, preferably over a pivot range of at least 55 degrees, and the axis angle 23 is preferably equal to zero over the remaining portion of the pivot range 24, in particular the entire remaining portion of the pivot range 24. Thus, expediently, the main swing arm axis 21 and the secondary swing arm axis 22 cross at the axis angle 23 over at least 80% of the pivot range 24 of the multi-joint arrangement 6, in particular over the entire pivot range 24 of the multi-joint arrangement 6, preferably over a pivot range 24 of 55 degrees, on that side of the base section 11 on which the tool 1 is arranged, and expediently run parallel to each other over the remaining portion of the pivot range 24, in particular over the entire remaining portion of the pivot range 24.

By means of the described embodiment it can be ensured that the tool 1 in various, preferably all, pivot positions is not pivoted in the feed direction 7 by the forces occurring during braking of the tool rotary movement 9 or is pivoted in the removal direction 8 by the forces occurring during braking of the tool rotary movement 9.

According to a preferred embodiment, the change in the axis angle 23 over at least 80% of the pivot range 24, in particular over the entire pivot range 24, is less than 20 degrees, in particular less than 10 degrees. Preferably, the maximum axis angle 23 occurring within the pivot range 24 is at most 20 degrees greater than the minimum axis angle 23 occurring within the pivot range. In this way, it can be achieved in particular that the force occurring during braking of the tool rotary movement 9 and acting in the removal direction 8 does not change too much over the entire pivot range 24.

The tool 1 is, as mentioned above, in particular designed as a saw blade. Exemplarily, the tool 1 is arranged coaxially with respect to the main swing arm joint 15. In an exemplary embodiment, the tool device 10 comprises the drive unit 27 for setting the tool 1 in the tool rotary movement 9. In an exemplary embodiment, the drive unit 27 is arranged on the main swing arm 14. Preferably, the drive unit 27 comprises an electric motor for setting the tool 1 in the tool rotary movement 9. The tool rotary movement 9 takes place about a different axis of rotation than the pivoting in the feed direction 7 and/or removal direction 8. Exemplarily, the tool rotary movement 9 takes place about an axis of rotation which is aligned coaxially with the pivot axis of the main swing arm joint 15, in particular over the entire pivot range 24. The direction of rotation of the tool rotary movement 9 is preferably the same as the direction of rotation of the pivoting of the tool 1 in the feed direction 7.

In an exemplary embodiment, the tool braking device 5 is arranged on the side swing arm joint 17. Alternatively, the tool braking device 5 can also be arranged on the side swing arm 16. The tool braking device 5 serves to brake the tool rotary movement 9, in particular to a standstill.

In an exemplary embodiment, the tool braking device 5 has the braking body 41 which can expediently be brought into contact with the tool 1 in order to brake the tool rotary movement 9. Exemplarily, the brake body 41 is brought into contact with the cutting edge of the tool 1, configured as a saw blade, in order to brake the tool rotary movement. Exemplarily, the brake body 41 is movably, in particular pivotably, mounted on the side swing arm joint 17 and can expediently be brought into contact with the tool 1 by pivoting about a pivot axis in order to brake the tool 1, the pivot axis extending in particular parallel to the x-direction. Preferably, the pivot axis about which the brake body 41 is pivotable is coaxial with the pivot axis of the side swing arm joint 17. The tool braking device 5 expediently comprises an actuator unit for bringing the brake body 41 into contact with the tool 1.

As an alternative to the embodiment shown, the tool braking device 5 may also be configured to brake the tool 1 indirectly, in particular by braking an element, for example a shaft, that is connected to the tool 1 in a rotationally fixed manner.

In an exemplary embodiment, the tool device 10 comprises a tool head 39 which comprises the tool 1, the multi-joint arrangement 6 and, expediently, the tool braking device 5. Exemplarily, the working area 33 is located in the z-direction between the tool head 39 and the workpiece support surface 3.

Exemplarily, the tool device 10 further comprises a linear bearing 29 which allows a linear movement 31 of the tool 1, in particular of the tool head 39, relative to the working area 33, in particular relative to the support structure 2, preferably to the workpiece support surface 3. Exemplarily, the linear movement 31 takes place in the y-direction.

In an exemplary embodiment, the tool device 10 further comprises a linear bearing braking device 32 which is configured to brake and/or prevent the linear movement 31 of the tool 1, in particular of the tool head 39, relative to the workpiece support surface 3 when the tool braking device 5 brakes the tool rotary movement 9. In particular, the linear bearing braking device 32 is configured to brake and/or prevent the linear movement 31 of the tool 1, in particular of the tool head 39, relative to the workpiece support surface 3 in response to the triggering of the tool braking device 5.

Exemplarily, the linear bearing braking device 32 is configured to lock the linear bearing 29 before, during, or after the braking operation of the tool braking device 5, so as to prevent the tool 1 from being set into linear movement 31 by the braking operation of the tool braking device 5. For example, the linear bearing braking device 32 is configured to provide increased friction for braking/preventing the linear movement 31. Further, the linear bearing braking device 32 may be configured to brake at a certain speed and/or to lock or brake upon abrupt acceleration. The linear bearing braking device 32 comprises, for example, a fluid damper and/or a clamping body.

Preferably, the linear bearing brake device 32 and/or the tool brake device 5 comprises a piezoelectric actuator, an electromagnetic actuator, a shape memory alloy (SMA) actuator, an electroactive polymer (EAP) actuator, a magnetic shape memory (MSM) actuator, a pneumatic actuator, a hydraulic actuator, a pyro actuator, a mechanical actuator, an electrostrictive actuator, and/or a thermal actuator.

The tool device 10 expediently comprises a control unit 61, for example a microcontroller. The control unit 61 is adapted to provide a drive unit control signal to the drive unit 27 to cause the drive unit 27 to set the tool 1 in the tool rotary movement 9. The control unit 61 is expediently arranged to provide a braking device control signal to the tool braking device 5 to cause the tool braking device 5 to brake the tool rotary movement 9.

The control unit 61 is expediently further adapted to detect an operating condition and, based on the detected operating condition, to initiate braking of the tool rotary movement 9 by the tool braking device 5, in particular by providing the braking device control signal.

The operating state detected by the control unit 61 is in particular an emergency state. The emergency state is in particular a potentially dangerous situation for a user, in which the user may be injured, for example, by the tool 1 and/or the workpiece 4.

The control unit 61 is expediently adapted to detect the emergency condition on the basis of a detected contact and/or a detected falling below a predetermined minimum safety distance between the tool 1 and the human body, for example a finger.

Preferably, the tool device 10, in particular the control unit 61, is configured to supply an electrical detection signal to the tool 1 and to detect the emergency condition on the basis of a change in the detection signal. Expediently, the tool device 10, in particular the control unit 61, is configured to supply the electrical detection signal to the tool 1 by capacitive coupling. Expediently, the tool device 10, in particular the control unit 61, is adapted to detect the emergency condition, in particular the contact between the tool 1 and the human body, based on a capacitive change. Further details on how the detection of the emergency state can be implemented in an exemplary manner are described in EP 1 234 285 B1.

The control unit 61 is expediently further adapted to detect a kickback as the emergency condition. The term "kickback" in particularly means a condition in which, during processing of the workpiece 4 by the tool device 10, a sudden and unexpected force occurs between the tool device 10 and the workpiece 4, causing the tool device 10 and/or the workpiece 4 to move.

The tool device 10 expediently comprises a sensor device, for example an acceleration sensor and/or a force sensor, in particular a strain gauge arrangement, for detecting the kickback. Such a sensor device is described, for example, in WO 2019/020307 A1.

The control unit 61 is expediently further adapted to detect, as the emergency condition, a misoperation of the tool device 10. For example, an incorrect operation may occur when a user moves the tool 1 too quickly, for example pivots it too quickly around the base section joint 12. Exemplarily, the control unit 61 is adapted to detect that the user is moving the tool 1 too fast and to trigger braking of the tool rotary movement 9 with the tool braking device 5 based on this detection.

Figure 6:
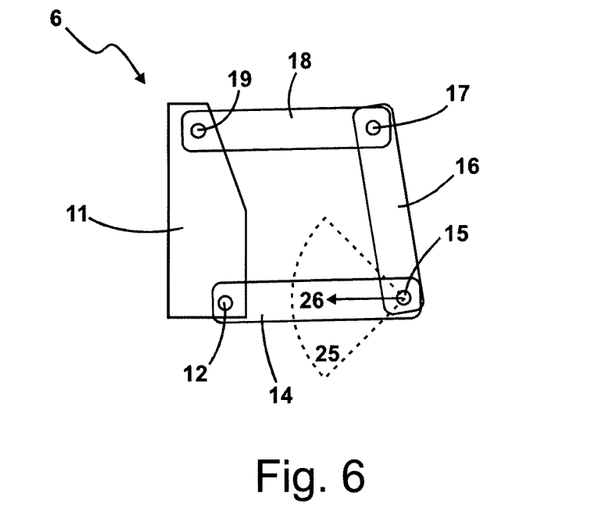

FIG. 6 shows an angular range 25 of the force direction of a force occurring in the main swing arm joint 15 during braking. Exemplarily, this force is the sum of the second first-stage force 52 and the second second-stage force 54 explained above. The force direction of this force depends expediently on the position of the tool brake device 5 relative to the pivot axis of the main swing arm joint 15, in particular on the orientation of the (imaginary) connecting line between the contact point 73 (see FIG. 3) and the main swing arm joint 15.

Preferably, the tool braking device 5 is arranged in such a way that the force occurring in the main swing arm joint 15 during braking of the tool rotary movement 9 lies in an angular range 25 of +−95 degrees, preferably +−45 degrees, about an axial direction 26 lying on the main swing arm axis 21, the axial direction 26 pointing in the direction of the base section joint 12. Suitably, this force acts on the tool bearing, in particular a saw blade bearing. Exemplarily, this force is applied to the main swing arm 14 via the tool bearing.

Due to the described angular range 25 of this force, it can be prevented that the force occurring in the main swing arm joint 15 during braking of the tool rotary movement 9, the force in particular occurring in the tool bearing, acts in a critical direction of the tool bearing, so that it is not necessary to design the tool bearing with thick walls in this critical direction. The tool bearing can therefore be designed with a narrow bearing seat, whereby a higher cutting capacity of the saw can be achieved.

According to a preferred embodiment, the tool braking device 5 is arranged on the side swing arm 16. In particular, the tool braking device 5 is structurally connected to the side swing arm 16, and in particular in such a way that in the braking state, when the tool braking device 5 blocks the tool rotary movement 9, the tool 1 (via the tool braking device 5) is fixed relative to the side swing arm 16, so that no relative movement between the tool 1 and the side swing arm 16 is possible.

Figure 7:
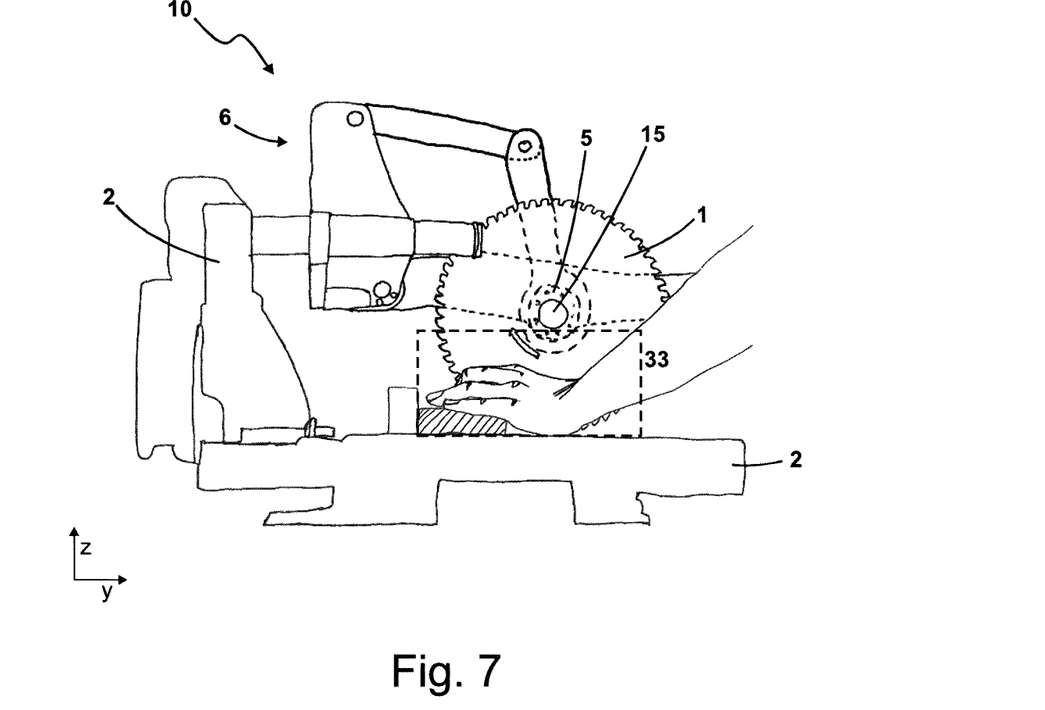

FIG. 7 shows a first exemplary variant of the tool device 10, in which the tool braking device 5 is arranged on the side swing arm 16 and exemplarily on the main swing arm joint 15, and in particular about the pivot axis of the main swing arm joint 15.

The tool braking device 5 is preferably reversible, so that after a braking operation the tool braking device 5 can expediently be returned to an initial state, from which a further braking operation can be carried out, without replacing any component of the tool braking device 5. Exemplarily, the tool braking device 5 comprises one or more braking bodies which are brought into contact with a shaft, coupled to the tool 1, for braking the tool 1.

Exemplarily, a plurality of braking bodies are provided which are circumferentially distributed around the shaft coupled to the tool 1.

Figure 10:
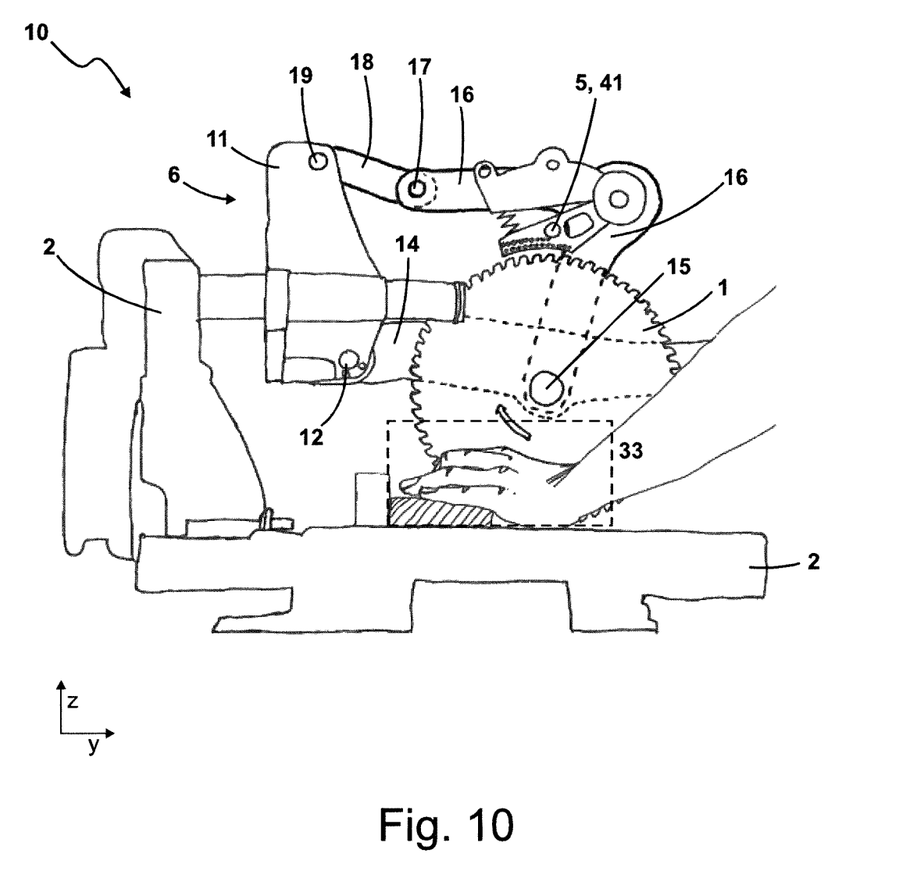

FIG. 10 shows a second exemplary variant of the tool device 10, in which the tool braking device 5 is arranged at the side swing arm 16 and exemplarily (with respect to the course of the side swing arm 16) between the main swing arm joint 15 and the side swing arm joint 17. Exemplarily, the side swing arm 16 has an L-shaped course and the tool brake device 5 is expediently arranged at the bend of the side swing arm 16. According to an alternative embodiment (not shown in the figures), the side swing arm 16 has a different course, i.e. in particular not an L-shaped course.

Expediently, the tool braking device 5 is arranged in such a way that the distance of the tool braking device 5 to the outer diameter of the tool 1, for example the saw blade, remains constant when the tool 1 is pivoted (by means of the multi-joint arrangement 6). Expediently, the braking device 5 is arranged to move at a constant distance around the tool 1, in particular the saw blade, when the tool 1 is pivoted by means of the multi-joint arrangement 6.

Expediently, the tool device 10, in particular the control unit 61, is configured to deactivate the drive unit 27 in connection with the triggering of the tool braking device 5.

Expediently, the tool device 10, in particular the control unit 61, is adapted to perform the deactivation of the drive unit 27 with a time delay with respect to the triggering of the tool braking device 5. As explained below with reference to FIG. 8, the drive unit 27 can thereby be used in an advantageous manner to increase the force acting in the removal direction 8 and/or to make this force act for a longer time, so that the tool 1 is pivoted further and/or for a longer time in the removal direction 8, for example.

Figure 8:
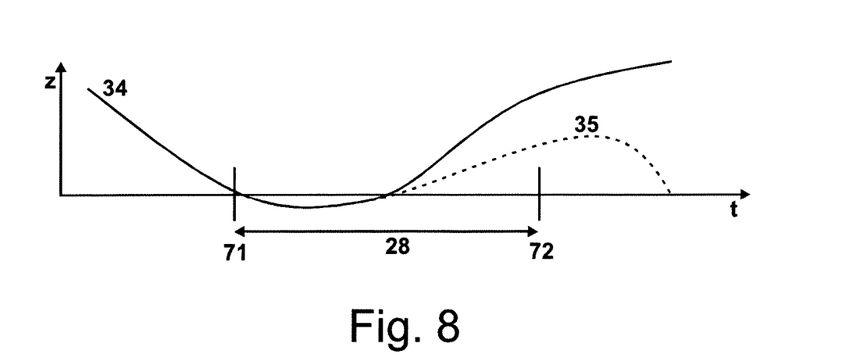

FIG. 8 shows a diagram of a temporal course of the z-position of the tool 1 during a braking operation of the tool braking device 5. The solid line 34 shows the temporal course of the z-position when the delay time 28 explained below is provided, and the dashed line 35 shows the temporal course of the z-position when the delay time is not provided. The zero line of the z-axis is here intended to indicate a boundary to a dangerous z-range, for example a z-range in which injury to the user may occur, and/or indicates the working range 33.

The tool device 10, in particular the control unit 61, is preferably configured to maintain a delay time 28 between a triggering of the tool braking device 5 and a switching off of the drive unit 27. The delay time 28 is exemplarily between 20 ms and 1 s. During the delay time 28, the tool device 10 is configured to redirect, by means of the multi-joint arrangement 6, a driving force provided by the drive unit 27 and acting on the tool 1, so that, by this redirecting of the driving force, the tool 1 is pivoted in the removal direction 8. In particular, the multi-joint arrangement 6 converts the first-stage forces 51 and 52 resulting from the rotary drive of the tool 1 into the force components 56, 58, which expediently result in a force acting in the removal direction 8.

Exemplarily, the tool 1 is initially moved downward in the z-direction (for example, by a user manually moving the tool 1 in a downward pivoting motion via the handle 59). At a trigger time 71, the tool device 10 triggers the tool braking device 5, for example in response to the tool 1 being in contact with the user. Exemplarily, the tool 1 enters the dangerous z-range at the trigger time 71 (or shortly before). The triggering of the tool braking device 5 expediently brakes the tool rotary movement 9 to a standstill. The drive unit 27 remains active and exerts a torque acting in the direction of the tool rotary movement 9 on the braked tool 1. As a result of the braking process and the drive unit 27 remaining active, a force is provided in the direction of the removal direction 8, so that the tool 1 is pivoted in the removal direction 8, as shown in FIG. 8 by the increase in the z-direction. At the switch-off time 72, the tool device 10 finally deactivates the drive unit 27.

The dashed line 35 shows a conventional course, in which the deactivation of the drive unit 27 occurs simultaneously with the triggering of the tool brake device 5. In this case, a shorter acting and/or weaker force is provided in the removal direction 8. Often, at the time when the tool brake device 5 is triggered, the multi-joint arrangement 6 is manually guided by the user, for example by means of the handle 59. If in this condition a force in the removal direction 8 occurs, the user typically tends to counteract this force and apply a force in the feed direction 7, for example pushing the tool 1 downwards via the handle 59. If the force acting in the removal direction 8 is provided only briefly, there is a risk that the user's application of force will cause the tool 1 to move in the feed direction 7, which may result in serious injury to the user.

By providing the delay time 28 and by the thus effected greater and/or longer force in the removal direction 8, it can be achieved that the user realizes the dangerous situation in due time and stops the manual actuation of the multi-joint arrangement 6 acting in the feed direction 7 before causing a pivoting in the feed direction 7.

Figure 9:
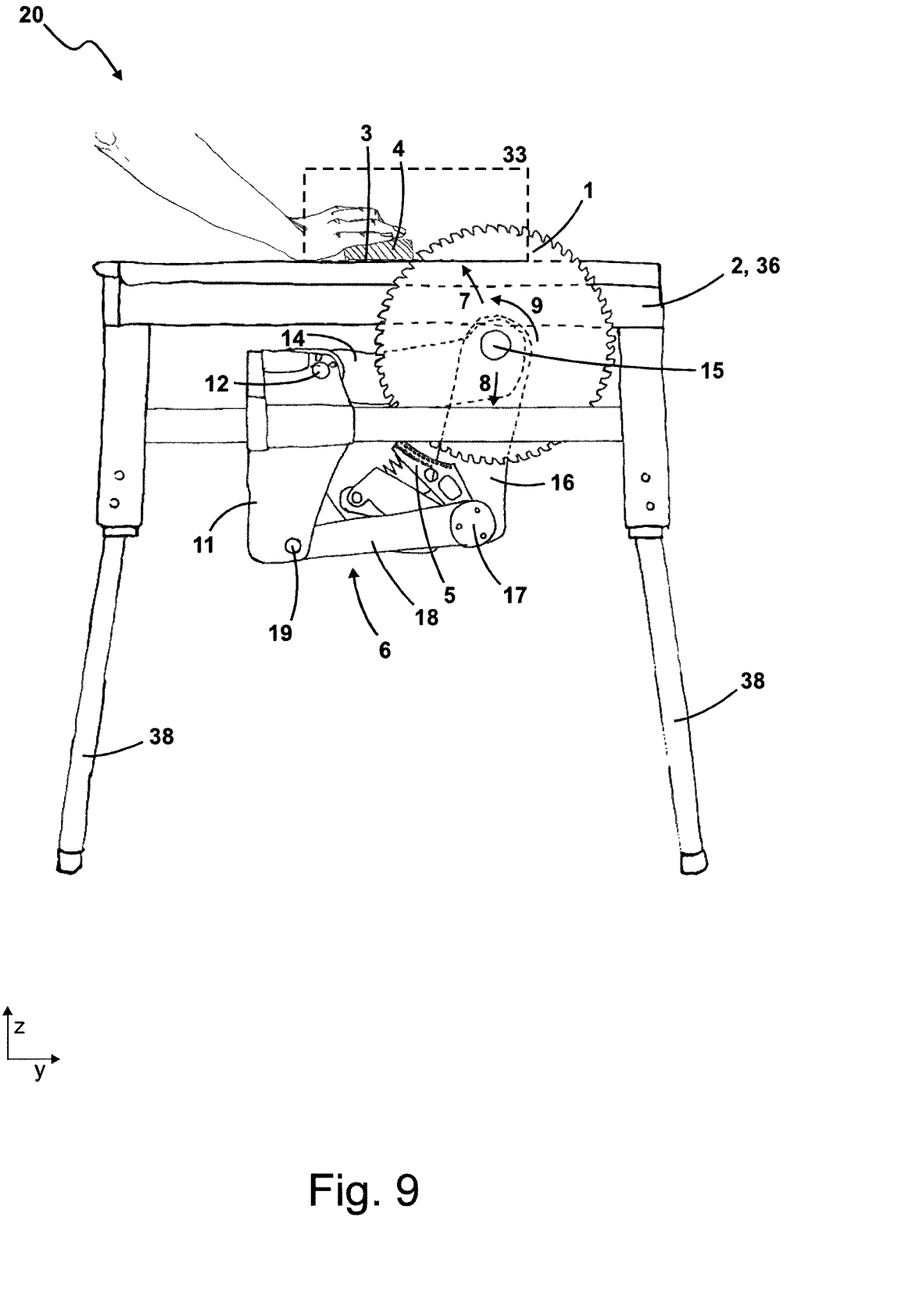

FIG. 9 shows a tool device 20 according to a second embodiment. Except for the differences explained below, the tool device 20 is preferably designed in correspondence with the tool device 10 according to the first embodiment explained above, so that the features explained above are expediently also present in the tool device 20.

The tool device 20 is exemplarily designed as a table saw, in particular as a table pull saw. In the tool device 20 according to the second embodiment, the multi-joint arrangement 6 is expediently located in the z-direction below the working area 33, in particular below the workpiece support surface 3. The tool 1 projects (in the working position shown) at least partially in the z-direction beyond the workpiece support surface 3. In the safety position, the tool 1 is preferably located completely below the workpiece support surface 3. By means of the multi-joint arrangement 6, the tool 1 can be pivoted selectively in the removal direction 8 (from the working position to the safety position) or in the feed direction 7 (from the safety position to the working position).

Compared to the first embodiment, in the second embodiment the multi-joint arrangement 6 is expediently mirrored about an x-y plane so that the main swing arm 14 lies above the secondary swing arm 18 in the z-direction.

When braking the tool rotary movement 9, the multi-joint arrangement 6 causes the tool 1 to be pivoted not in the feed direction 7, but expediently in the removal direction 8—that is, in an exemplary manner, downwards.

The rotation vector of the pivoting in feed direction 7 points exemplarily in the same direction as the rotation vector of the tool rotary movement 9 and in opposite direction to the rotation vector of the pivoting in the removal direction 8.

The invention claimed is:

1. A tool device with a tool for processing a workpiece located in a working area, comprising:
    a tool braking device for braking a tool rotary movement of the tool, and
    a multi-joint arrangement by means of which the tool can be pivoted selectively in a feed direction into the working area or in a removal direction out of the working area, wherein
    the multi-joint arrangement is designed to, while maintaining the pivotability of the tool, absorb and/or redirect forces occurring during braking of the tool rotary movement, so that the tool is not pivoted in the feed direction by the forces occurring during braking of the tool rotary movement or is pivoted in the removal direction by the forces occurring during braking of the tool rotary movement, wherein the multi-joint arrangement comprises a base section, a main swing arm pivotally mounted on the base section via a base section joint, a side swing arm pivotally mounted to the main swing arm via a main swing arm joint, and a secondary swing arm pivotally mounted to the side swing arm via a side swing arm joint and pivotally mounted to the base section via a secondary swing arm joint, wherein an imaginary main swing arm axis extending through the base section joint and the main swing arm joint and an imaginary secondary swing arm axis extending through the secondary swing arm joint and the side swing arm joint run parallel to each other or converge at an axis angle on that side of the base section on which the tool is arranged.

2. The tool device according to claim 1, wherein the multi-joint arrangement is designed and/or arranged in such a way that during braking of the tool rotary movement a centre of gravity of the tool device moves in a direction different from the feed direction during pivoting of the tool device.

3. The tool device according to claim 1, wherein the multi-joint arrangement comprises at least four joints.

4. The tool device according to claim 1, wherein the axis angle is between 45 degrees and 0 degrees.

5. The tool device according to claim 1, wherein, over at least 80% of the pivot range of the multi-joint arrangement or over the entire pivot range of the multi-joint arrangement or over a pivot range of 55 degrees, the main swing arm axis and the secondary swing arm axis run parallel to each other or converge at an axis angle on that side of the base section on which the tool is arranged.

6. The tool device according to claim 1, wherein, over at least 80% of the pivot range of the multi-joint arrangement, the main swing arm axis and the secondary swing arm axis converge at an axis angle on that side of the base section on which the tool is arranged.

7. The tool device according to claim 5, wherein over at least 80% of the pivot range or over the entire pivot range, the change in the axis angle is less than 20 degrees.

8. The tool device according to claim 1, wherein the tool is arranged coaxially with the main swing arm joint.

9. The tool device according to claim 1, wherein the tool braking device is arranged on the side swing arm.

10. The tool device according to claim 1, wherein the tool braking device is arranged in such a way that a force occurring in the main swing arm joint during braking of the tool rotary movement lies in an angular range of +−95 degrees about an axial direction lying on the main swing arm joint axis and pointing in the direction of the base section joint.

11. The tool device according to claim 1, further comprising a drive unit for setting the tool in the tool rotary movement, wherein the drive unit is arranged on the main swing arm.

12. The tool device according to claim 1, further comprising a drive unit for setting the tool in the tool rotary movement, the tool device being adapted to maintain a delay time of between 20 ms and 1 s between a triggering of the tool braking device and a switching off of the drive unit and, during the delay time, to redirect a drive force, which is provided by the drive unit and acts on the tool, by means of the multi-joint arrangement, so that the tool is pivoted in the removal direction.

13. The tool device according claim 1, further comprising a linear bearing allowing a linear movement of the tool relative to the workpiece support surface, further comprising a linear bearing braking device adapted to brake and/or prevent the linear movement of the tool relative to the workpiece support surface when braking the tool rotary movement.

14. The tool device according to claim 1, wherein the tool device is a saw device.

15. The tool device according to claim 4, wherein the axis angle is between 15 degrees and 5 degrees.

16. The tool device according to claim 6, wherein the main swing arm axis and the secondary swing arm axis run parallel to each other over the remaining portion of the pivot range.

17. The tool device according to claim 9, wherein the tool braking device is arranged on the main swing arm joint or on the side swing arm joint.

18. The tool device according to claim 1, wherein the tool braking device is arranged in such a way that a force occurring in the main swing arm joint during braking of the tool rotary movement lies in an angular range of +−45 degrees about an axial direction lying on the main swing arm joint axis and pointing in the direction of the base section joint.

19. The tool device according to claim 1, wherein in a working position, in which the tool projects into the working area, and in a safety position, in which the tool is positioned outside the working area, the secondary swing arm joint is with regard to a vertical direction positioned above the main swing arm joint.

20. A tool device with a tool for processing a workpiece located in a working area, comprising:
a tool braking device for braking a tool rotary movement of the tool, and
a multi-joint arrangement by means of which the tool can be pivoted selectively in a feed direction into the working area or in a removal direction out of the working area,
wherein the multi-joint arrangement is designed to, while maintaining the pivotability of the tool, absorb and/or redirect forces occurring during braking of the tool rotary movement, so that the tool is not pivoted in the feed direction by the forces occurring during braking of the tool rotary movement or is pivoted in the removal direction by the forces occurring during braking of the tool rotary movement,
wherein the multi-joint arrangement comprises a base section, a main swing arm pivotally mounted on the base section via a base section joint, a side swing arm pivotally mounted to the main swing arm via a main swing arm joint, and a secondary swing arm pivotally mounted to the side swing arm via a side swing arm joint and pivotally mounted to the base section via a secondary swing arm joint,
wherein over at least 80% of the pivot range of the multi-joint arrangement, the main swing arm axis and the secondary swing arm axis converge at an axis angle on that side of the base section on which the tool is arranged.

21. The tool device according to claim 20, wherein in a working position, in which the tool projects into the working area, and in a safety position, in which the tool is positioned outside the working area, the secondary swing arm joint is with regard to a vertical direction positioned above the main swing arm joint.

22. A tool device with a tool for processing a workpiece located in a working area, comprising:
   a tool braking device for braking a tool rotary movement of the tool, and
   a multi-joint arrangement by means of which the tool can be pivoted selectively in a feed direction into the working area or in a removal direction out of the working area, wherein
   the multi-joint arrangement is designed to, while maintaining the pivotability of the tool, absorb and/or redirect forces occurring during braking of the tool rotary movement, so that the tool is not pivoted in the feed direction by the forces occurring during braking of the tool rotary movement or is pivoted in the removal direction by the forces occurring during braking of the tool rotary movement,
   wherein the tool device further comprises a drive unit for setting the tool in the tool rotary movement, the tool device being adapted to maintain a delay time between a triggering of the tool braking device and a switching off of the drive unit and, during the delay time, to redirect a drive force, which is provided by the drive unit and acts on the tool, by means of the multi-joint arrangement, so that the tool is pivoted in the removal direction.

23. A tool device with a tool for processing a workpiece located in a working area, comprising:
   a tool braking device for braking a tool rotary movement of the tool, and
   a multi-joint arrangement by means of which the tool can be pivoted selectively in a feed direction into the working area or in a removal direction out of the working area, wherein
   the multi-joint arrangement is designed to, while maintaining the pivotability of the tool, absorb and/or redirect forces occurring during braking of the tool rotary movement, so that the tool is not pivoted in the feed direction by the forces occurring during braking of the tool rotary movement or is pivoted in the removal direction by the forces occurring during braking of the tool rotary movement,
   wherein the multi-joint arrangement comprises a base section, a main swing arm pivotally mounted on the base section via a base section joint, a side swing arm pivotally mounted to the main swing arm via a main swing arm joint, and a secondary swing arm pivotally mounted to the side swing arm via a side swing arm joint and pivotally mounted to the base section via a secondary swing arm joint,
   wherein the tool device further comprises a handle arranged on the main swing arm, wherein the handle is for manually effecting a pivoting of the tool by means of the multi-joint arrangement.

24. A tool device with a tool for processing a workpiece located in a working area, comprising:
   a tool braking device for braking a tool rotary movement of the tool, and
   a multi-joint arrangement by means of which the tool can be pivoted selectively in a feed direction into the working area or in a removal direction out of the working area, wherein
   the multi-joint arrangement is designed to, while maintaining the pivotability of the tool, absorb and/or redirect forces occurring during braking of the tool rotary movement, so that the tool is not pivoted in the feed direction by the forces occurring during braking of the tool rotary movement or is pivoted in the removal direction by the forces occurring during braking of the tool rotary movement,
   wherein the tool device further comprises a linear bearing allowing a linear movement of the tool relative to the workpiece support surface.

* * * * *